United States Patent

Nguyen

(10) Patent No.: US 8,345,387 B1
(45) Date of Patent: Jan. 1, 2013

(54) DISK DRIVE WITH TRANSVERSE PLANE DAMPER

(75) Inventor: Tu Nguyen, San Jose, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 269 days.

(21) Appl. No.: 12/826,371

(22) Filed: Jun. 29, 2010

(51) Int. Cl.
G11B 5/55 (2006.01)

(52) U.S. Cl. .................................. 360/265.9; 360/97.19

(58) Field of Classification Search ............... 360/265.7, 360/265.8, 265.9, 97.19
See application file for complete search history.

(56) References Cited

U.S. PATENT DOCUMENTS

| | | | |
|---|---|---|---|
| 3,713,121 A | 1/1973 | Fasano | |
| 5,801,905 A | 9/1998 | Schirle | |
| 5,936,808 A | 8/1999 | Huang | |
| 6,091,574 A | 7/2000 | Misso | |
| 6,215,623 B1 * | 4/2001 | Zhu | 360/244.3 |
| 6,245,265 B1 | 6/2001 | Chung | |
| 6,297,933 B1 * | 10/2001 | Khan et al. | 360/244.2 |
| 6,310,746 B1 | 10/2001 | Hawwa | |
| 6,310,749 B1 | 10/2001 | Beatty | |
| 6,392,845 B1 | 5/2002 | Tsuda | |
| 6,498,704 B1 | 12/2002 | Chessman | |
| 6,512,658 B1 | 1/2003 | Jierapipatanakul | |
| 6,563,676 B1 | 5/2003 | Chew | |
| 6,678,121 B2 | 1/2004 | Lee | |
| 6,697,225 B2 | 2/2004 | Wittig | |
| 6,704,164 B1 * | 3/2004 | Hiraoka | 360/244.8 |
| 6,744,597 B2 | 6/2004 | Nguyen | |
| 6,775,104 B2 | 8/2004 | Hong | |
| 6,879,466 B1 | 4/2005 | Oveyssi | |
| 6,937,444 B1 | 8/2005 | Oveyssi | |
| 6,947,260 B2 | 9/2005 | Dominguez | |
| 6,970,327 B2 | 11/2005 | MacLeod | |
| 6,982,852 B2 | 1/2006 | Nagahiro | |
| 7,082,014 B2 | 7/2006 | Kim | |
| 7,352,537 B2 | 4/2008 | Dominguez | |
| 7,489,480 B2 | 2/2009 | Gong | |
| 7,697,240 B2 * | 4/2010 | Funabashi et al. | 360/265.9 |
| 2003/0169537 A1 | 9/2003 | Weichelt | |
| 2005/0152070 A1 | 7/2005 | Funabashi | |
| 2006/0221505 A1 | 10/2006 | Fujimoto | |
| 2008/0037178 A1 | 2/2008 | Nguyen | |
| 2008/0151433 A1 | 6/2008 | Soga | |
| 2008/0226949 A1 | 9/2008 | Hanrahan | |
| 2008/0310054 A1 | 12/2008 | Fu | |
| 2009/0002894 A1 | 1/2009 | Kerner | |
| 2009/0059435 A1 | 3/2009 | Huang | |

* cited by examiner

*Primary Examiner* — Angel A. Castro

(57) ABSTRACT

Described herein is a disk drive having an actuator arm constrained layer damper, for reducing, during use, vibration of the actuator arm. The damper can include a first substantially planar portion that is configured to be positioned on and coupled to a top surface of an actuator arm. The damper can also include a second substantially planar portion extending in a plane transverse to the first planar portion and configured to be coupled to at least one of a side surface of the actuator arm or a surface of an adjacent actuator body.

22 Claims, 7 Drawing Sheets

DISK DRIVE WITH TRANSVERSE PLANE DAMPER

BACKGROUND

Hard disk drives, (HDD) are often used in electronic devices, such as computers, to record data onto or to reproduce data from a recording media, which can be a disk having one or more recording surfaces. The HDD also includes a head for reading the data on a recording surface of the disk and for writing data unto one of the surfaces. An actuator is provided for moving the head over a desired location, or track of the disk.

The HDD includes a spindle motor for rotating the disk during operation. When the disk drive is operated, and the actuator moves the head over the disk, the head is floated a predetermined height above the recording surface of the disk while the disk is rotated, and the head detects and/or modifies the recording surface of the disk to retrieve, record, and/or reproduce data from and/or onto the disk.

When the HDD is not in operation, or when the disk is not rotating, the head can be rotated by the actuator to a position such that the head is not over the disk or the recording surfaces. In this non-operational configuration, the head is "parked off" of the recording surface of the disk.

BRIEF DESCRIPTION OF THE DRAWINGS

A general architecture that implements the various features of the disclosure will now be described with reference to the drawings. The drawings and the associated descriptions are provided to illustrate embodiments of the disclosure and not to limit the scope of the disclosure. Throughout the drawings, reference numbers are reused to indicate correspondence between referenced elements.

DETAILED DESCRIPTION

Figure 1:
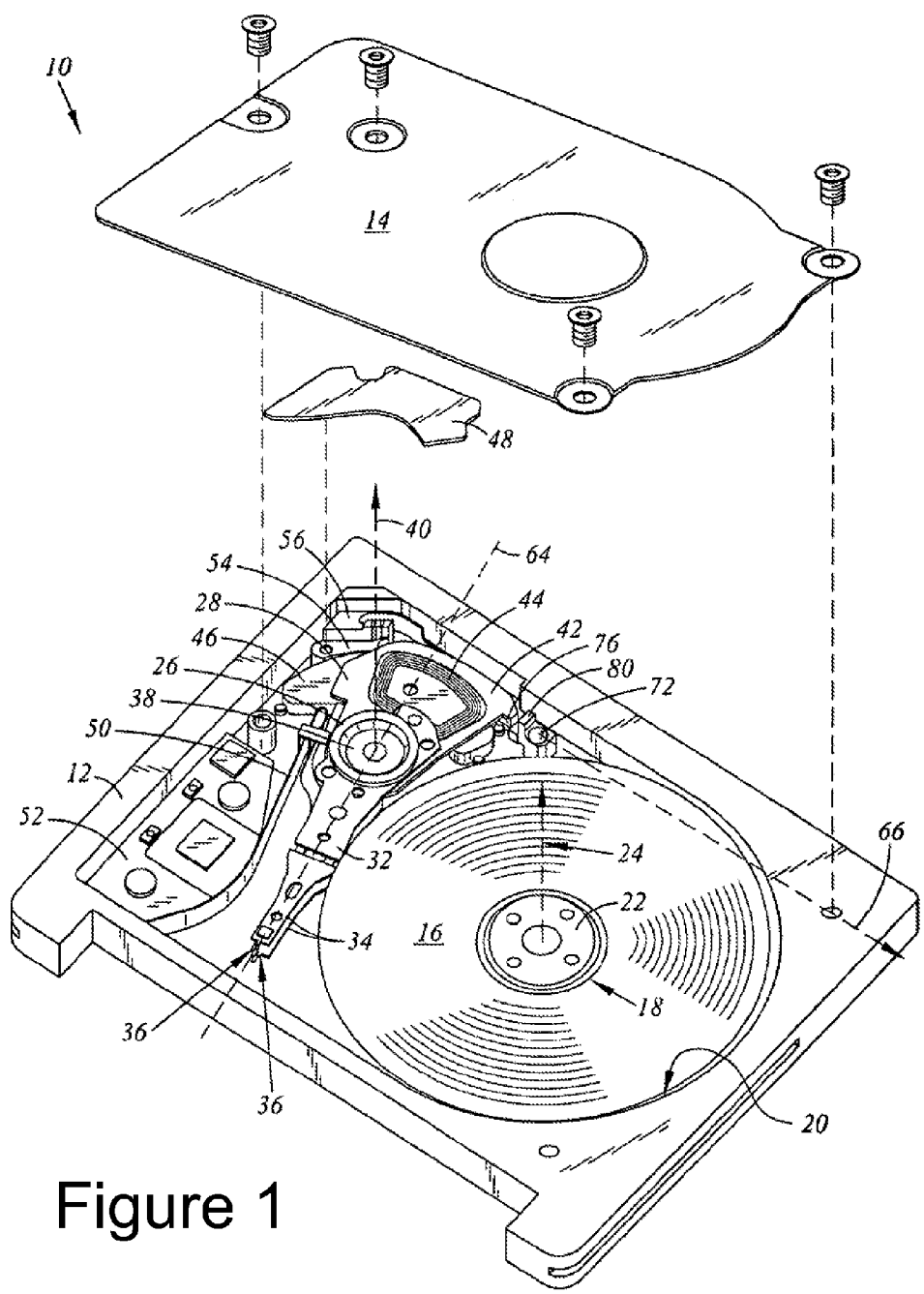
FIG. 1 depicts a perspective view of a disk drive in accordance with one embodiment.

Referring now to FIG. 1, there is depicted an exploded perspective view of a disk drive 10 according to embodiments described herein. The disk drive 10 includes a head disk assembly (HDA) and a printed circuit board assembly (PCBA). The head disk assembly includes a disk drive housing having disk drive housing members, such as a disk drive base 12 and a cover 14. The disk drive base 12 and the cover 14 collectively house at least one disk 16. A single disk or additional disks may be included in the disk drive.

The disk 16 includes an inner diameter (ID) 18 and an outer diameter (OD) 20. The disk 16 further includes a plurality of tracks on its recording surface, or face, for storing data. The disk 16 may be of a magnetic recording type of storage device, however, other arrangements (e.g., optical recording) may be utilized. The head disk assembly further includes a spindle motor 22 for rotating the disk 16 about a disk rotation axis 24. The head disk assembly further includes a head stack assembly 26 rotatably attached to the disk drive base 12 in operable communication with the disk 16. The head stack assembly 26 includes an actuator 28.

The actuator 28 includes an actuator body and at least one actuator arm 32 that extends from the actuator body. Some embodiments include multiple arms 32. Distally attached to the actuator arms 32 are suspension assemblies 34. The suspension assemblies 34 respectively support heads 36. The suspension assemblies 34 with the heads 36 are referred to as head gimbal assemblies. The number of actuator arms and suspension assemblies may vary depending upon the number of disks and disk surfaces utilized.

The head 36 can include a transducer for writing and reading data. The transducer can include a writer and a read element. In magnetic recording applications, the transducer's writer may be of a longitudinal or perpendicular design, and the read element of the transducer may be inductive or magnetoresistive.

In optical and magneto-optical recording applications, the head may also include an objective lens and an active or passive mechanism for controlling the separation of the objective lens from a disk surface of the disk 16. The disk 16 includes opposing disk surfaces. In magnetic recording applications the disk surface typically includes one or more magnetic layers. Data may be recorded along data annular regions on a single disk surface or both.

The head stack assembly 26 may be pivoted such that each head 36 is disposed adjacent to the various data annular regions from adjacent to the outer diameter 20 to the inner diameter 18 of the disk 16. In FIG. 1, the actuator body includes a bore, and the actuator 28 further includes a pivot bearing cartridge 38 engaged within the bore for facilitating the actuator body to rotate between limited positions about an axis of rotation 40.

The actuator 28 can further include a coil support element 42 that extends from one side of the actuator body opposite the actuator arms 32. The coil support element 42 is configured to support a coil 44. A VCM magnet 46 may be supported by the disk drive base 12. Posts may be provided to position the VCM magnet 46 in a desired alignment against the disk drive base 12. A VCM top plate 48 may be attached to an underside of the cover 14. The coil 44 is positioned, in some embodiments, between the VCM magnet 46 and the VCM top plate 48 to form a voice coil motor for controllably rotating the actuator 28.

The head stack assembly 26 can further include a flex cable assembly 50 and a cable connector 52. The cable connector 52 can be attached to the disk drive base 12 and is disposed in electrical communication with the printed circuit board assembly. The flex cable assembly 50 supplies current to the coil 44 and carries signals between the heads 36 and the printed circuit board assembly.

With this configuration, current passing through the coil 44 results in a torque being applied to the actuator 28. The actuator 28 includes an actuator longitudinal axis 64 which extends generally along the actuator arms 32. A change in direction of the current through the coil 44 results in a change in direction of the torque applied to the actuator 28, and consequently, the longitudinal axis 64 of the actuator arms 32 is rotated about the axis of rotation 40. It is contemplated that other magnet, VCM plate, coil and magnet support configurations may be utilized, such as a multiple coil arrangements, single or double VCM plates and a vertical coil arrangement.

The disk drive 10 can also include a latch 54. The latch 54 can include a fixed portion 56 that is firmly coupled to the disk drive base 12. The latch 54 further includes a latching portion that is engageable with fixed portion 56 to limit rotational movement of the actuator 28. Although the latch 54 is depicted as being located in a corner of the base, the latch 54 could be located in other portions of the disk drive and still perform its functions.

When the actuator 28 is rotated into the parked position, as illustrated in FIG. 1, the actuator 28 can include a contact member 76, which can be located on the coil support element 42 or elsewhere, that is configured to engage a crash stop 80 in order to limit rotation of the actuator 28 away from the disk 16. The crash stop 80 can be an integral part of the base 12, or the crash stop 80 can be connected to the base 12 via a fixation element 72. FIG. 1 depicts an axis of engagement 66 of the contact member 76 and the crash stop 80 as being in line with the fixation element 72, but other constructions are also permissible. A crash stop 80 can also be provided to limit movement of the actuator 28 toward the ID 18 of the disk 16.

Data is recorded onto a surface of the disk in a pattern of concentric rings known as data tracks. The disk surface is spun at high speed by means of a motor-hub assembly. Data tracks are recorded onto disk surface by means of the head 36, which typically resides at the end of the actuator arm 32. One skilled in the art understands that what is described for one head-disk combination applies to multiple head-disk combinations.

The dynamic performance of the HDD is a major mechanical factor for achieving higher data capacity as well as for manipulating the data faster. The quantity of data tracks recorded on the disk surface is determined partly by how well the head 36 and a desired data track can be positioned relative to each other and made to follow each other in a stable and controlled manner. There are many factors that can influence the ability of HDD to perform the function of positioning the head 36 and following the data track with the head 36. In general, these factors can be put into two categories; those factors that influence the motion of the head 36; and those factors that influence the motion of the data track. Undesirable motions can come about through unwanted vibration and undesirable tolerances of components.

During development of the HDD, the disk 16 and head 36 have undergone reductions in size. Much of the refinement and reduction has been motivated by consumer request and demand for more compact and portable hard drives 10. For example, the original hard disk drive had a disk diameter many times larger than those being developed and contemplated.

Smaller drives often have small components with relatively very narrow tolerances. For example, disk drive heads 36 are designed to be positioned in very close proximity to the disk surface. Due to the tight tolerances, vibration activity on the actuator arm 32 can adversely affect the performance of the HDD. For example, vibration of the actuator 28 can result in variations in the spacing between the head element and media.

In addition, as disk drive tracks per inch (TPI) increases, sensitivity to small vibrations also increases. Small vibrations can cause significant off-track and degraded performances. For example, in many cases, variations in the spacing between the head element and media can increase the off-track complications, and the increase in TPI compounds the complications and likely gives rise to data errors. These data errors can include both hard errors during writing and soft errors during reading. Moreover, vibration-induced errors become even more apparent as the actual offset distances and overall components are reduced in size.

Some HDD assemblies include one or more constrained layer dampers that operate to reduce adverse effects of vibrations during operation of the HDD. The constrained layer damper can include a stiffening layer, having a substantially planar surface, and an adhesive layer that is positioned between an actuator arm surface and the stiffening layer. The adhesive layer can include a viscoelastic material, which can be disposed upon a surface of the actuator arm between the actuator arm surface and a stiffener layer, and which operates, among other things, to secure the stiffening layer to the actuator arm. The stiffener layer may be formed of a non-magnetic metal or other substantially stiff material. Non-magnetic metals may include stainless steel, such as 300 series stainless steel, and/or aluminum.

The adhesive layer, also referred to herein as a viscoelastic layer, may be formed of a viscoelastic polymer. The viscoelastic layer may be adhesive in nature and may additionally function to maintain the constrained layer damper in position against the actuator. The constrained layer damper may be manufactured from sheets of material which may undergo a stamping process. As mentioned above, the constrained layer damper serves to mitigate resonant vibration of the actuator arms and the coil support.

The constrained layer damper, mounted on the actuator arms, works by dissipating the strain energy in the vibration modes of interest (e.g., arm torsion, arm sway, arm bending) into heat in the damping polymer of the viscoelastic layer. The stainless steel substrate (e.g., SUS3O4), or other stiffening materials provided herein, acts as a constraining layer for the viscoelastic damping polymer (bonded to the substrate) which undergoes shear deformation when the arms are vibrating in their natural modes. The effectiveness of damping depends on the degree of shear induced in the damping polymer by the specific vibration mode (function of mode shape), the thicknesses, elastic storage & loss moduli of the constraining layer and damping polymer and the frequency of the mode and the operating temperature of the HDD.

Described herein are methods and apparatus for utilizing constrained layer dampers to improve actuator dynamics in a hard disk drive. Arm dampers are also an effective measure to reduce carriage to carriage variability of arm-sway and arm-torsion mode gains and frequencies. The dampers also help reduce random transient vibration (RTV) and nonrepeatable run-out (NRRO) associated with arm modes (arm sway, arm torsion, arm bending).

Figure 2:
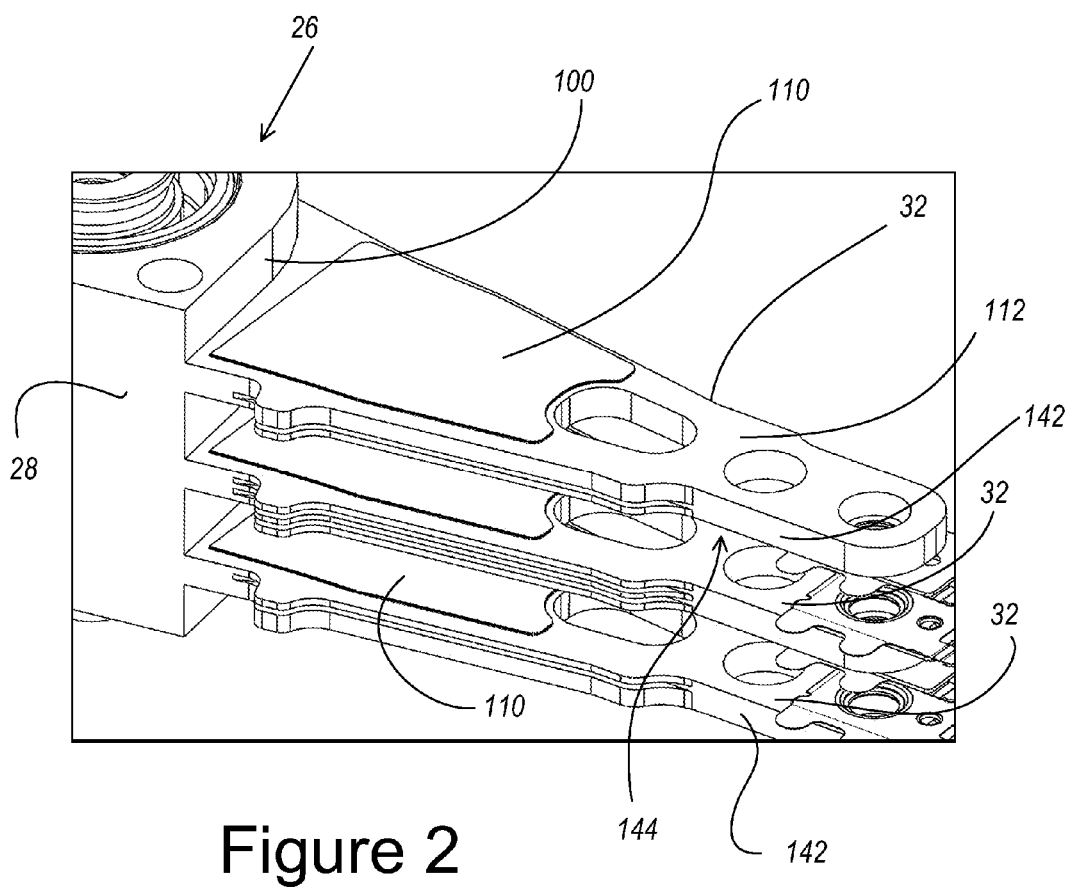
FIG. 2 depicts a head stack assembly with a plurality of actuator arms in accordance with one embodiment.

FIG. 2 depicts a head stack assembly 26 including an actuator 28 and a plurality of actuator arms 32 that extend from an actuator base 100. As depicted in FIG. 2, in one embodiment, a plurality of actuator arms 32 can include a damper 110 on a top surface 112 of the respective actuator arm 32. In one embodiment, the damper 110 extends from a position on the top surface 112 of the respective actuator arm adjacent the actuator based 100 and extending along a portion of the length of the top surface 112.

Figure 3:
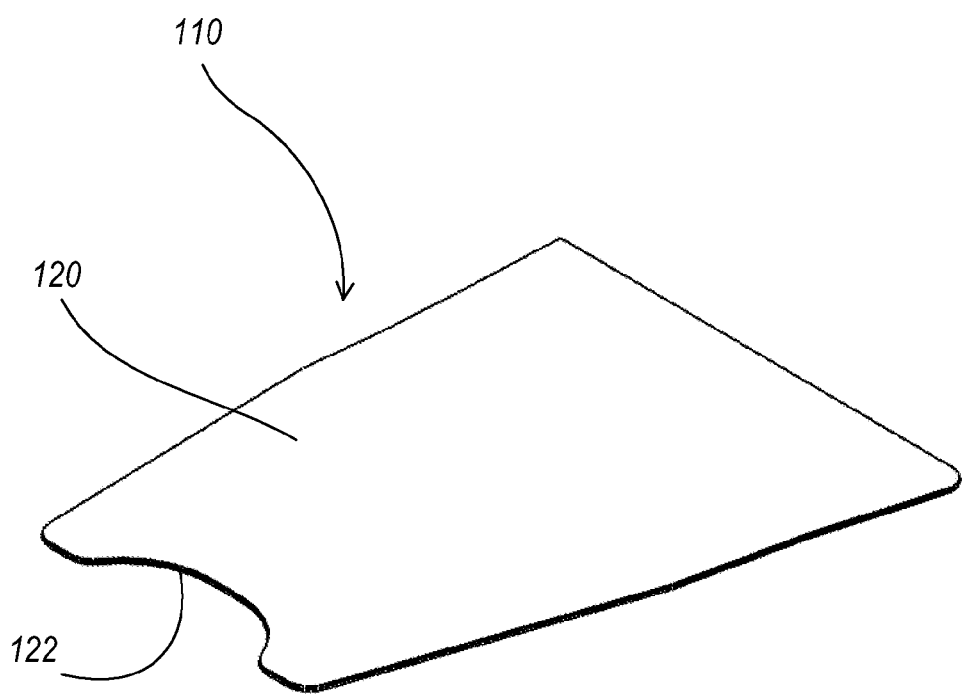
FIG. 3 illustrates a damper having a stiffening layer and an adhesive layer.
Figure 4:
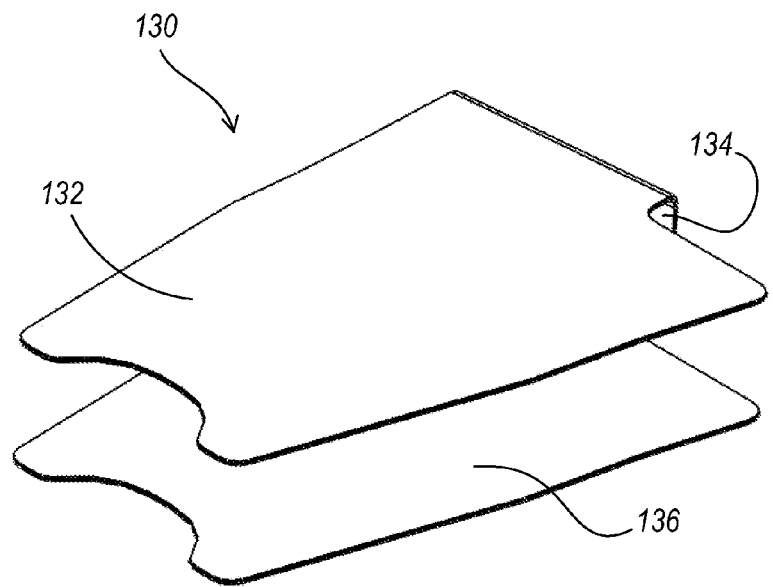
FIG. 4 illustrates a constrained layer in accordance with one embodiment.

FIG. 3 illustrates a damper 110 having a stiffening, or constrained, layer 120 and a viscoelastic, or adhesive, layer 122. The damper 110 can be applied to a top surface 112 of an actuator arm 32, as depicted in FIG. 2. FIG. 4 depicts an embodiment in accordance with the description herein of a stiffening or constrained layer 130. In the embodiment illustrated in FIG. 4, the constrained layer 130 can include a top damping plate 132, a base wall damping plate 134, and a bottom damping plate 136. Accordingly, the constrained layer 130 includes a first substantially planar portion (e.g., the top damping plate 132) and a second substantially planar portion (e.g., the base wall damping plate) that extends in a plane transverse to the first substantially planar portion.

As described herein, in one embodiment, the constrained layer damper 110 includes a stiffening layer, or constrained layer, 130 having a bend generally perpendicular to the arm surface to which the constrained layer damper 130 is attached. The adhesive layer 122 is preferably positioned between the arm surface and the constrained layer 130. In one embodiment, the constrained layer 130 provides a means to reduce and control vibration of the actuator arm 32.

The head stack assembly 26 has many modes of vibration. Arm modes of vibration are the movement of the arms that affect the servo bandwidth and can cause TMR. Some methods that suppress these arm resonances provide adding a flat arm damper attached to the arm. In some embodiments, the arm damper 110 can be enhanced by introducing an optimized bend to one edge of the arm damper 110 to significantly reduce the impact of vibrations.

The bend reduces the impact of vibrations by creating an increased strain energy inside the arm damper 110. Increased strain energy is achieved by increasing the relative motion between the constrained layer 130 in the arm 32. Deformation of the arm 32 during different modes of vibration cause relative motion between the constrained layer 130 and the arm 32. The bend section provides a fixed constraint at the root of the arm 32 and increases the relative displacement between the constrained layer 130 and the arm 32 during resonances. Resulting shear deformation in the viscoelastic layer 122 provides increased strain energy and increased damping energy dissipation.

In one embodiment, as depicted in FIG. 4, the constrained layer 130 includes a first portion, or the top damping plate 132, which is configured to extend substantially along one surface of the actuator arm 32. The constrained layer 130 also includes a base wall damping plate 134 that extends along a plane substantially transverse to a plane defined by the top damping plate 132. In some embodiments, the base wall damping plate 134 is configured to engage and couple to the actuator base 100. FIG. 4 also illustrates that the constrained layer 130 can include a bottom damping plate 136, which extends in a plane substantially parallel to the top damping plate 132. In some embodiments, the bottom damping plate 136 extends in a plane substantially transverse to a plane defined by the base wall damping plate 134, or a plane defined by the actuator based 100. In one embodiment, the base wall damping plate 134 is substantially perpendicular to the top damping plate 132 and the bottom damping plate 136.

Figure 5:
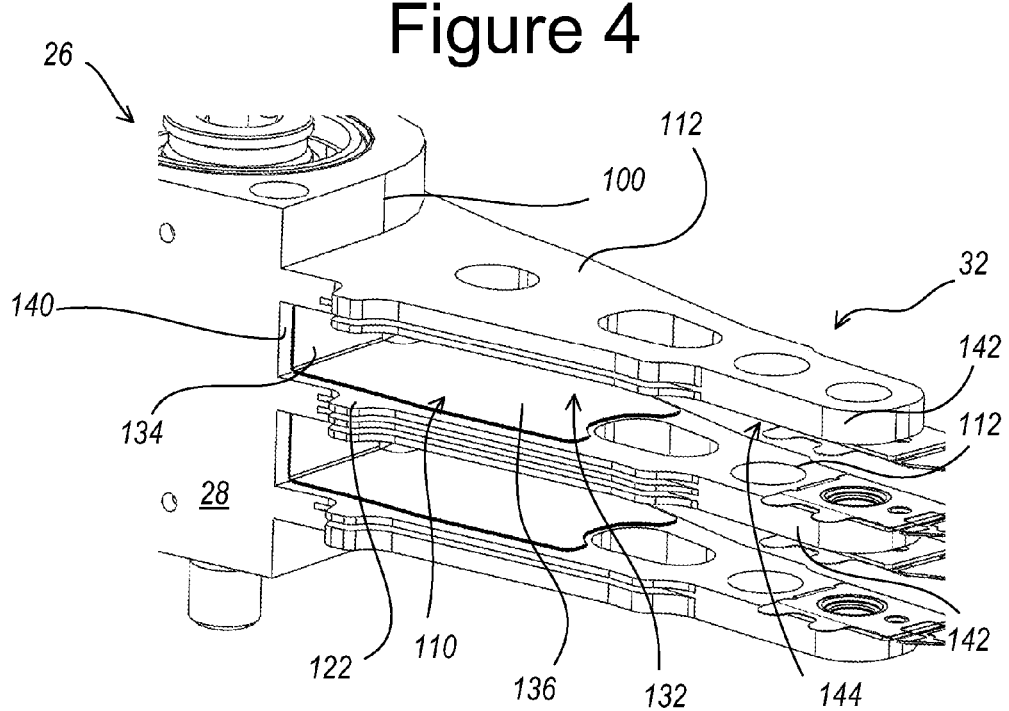
FIG. 5 illustrates a perspective view of a head stack assembly having a constrained layer in accordance with one embodiment.

FIG. 5 depicts, a head stack assembly 26 having a plurality of actuator arms 32 extending from the actuator base 100 of the actuator 28. As illustrated, the actuator base 100 can define an actuator base wall 140 that extends along the actuator base 100. The plurality of actuator arms 32 can each include a top surface 112, a side surface 142, and a bottom surface 144. Illustrated in FIG. 5 is a damper 110 that includes the constrained layer 130 shown in FIG. 4. As shown, the base wall damping plate 134 is configured to engage the actuator base wall 140, and the top damping plate 132 and the bottom damping plate 136 are configured to extend along top and bottom surfaces 112, 144 of the actuator arms 32.

The top damping plate 132 is designed to engage a bottom surface 144 of a first actuator arm 32. The bottom damping plate 136 is configured to engage a top surface 112 of a second actuator arm 32 positioned directly below the first actuator arm 32. The base wall damping plate 134 engages, when assembled, the actuator base wall 140 extending between the first and second actuator arms 32. A viscoelastic layer 122 is used to couple the constrained layer 130 to the actuator arms 32 and the actuator base walls 140. As shown in FIG. 5, two or more dampers 110 can be used with each head stack assembly 26.

Figure 6:
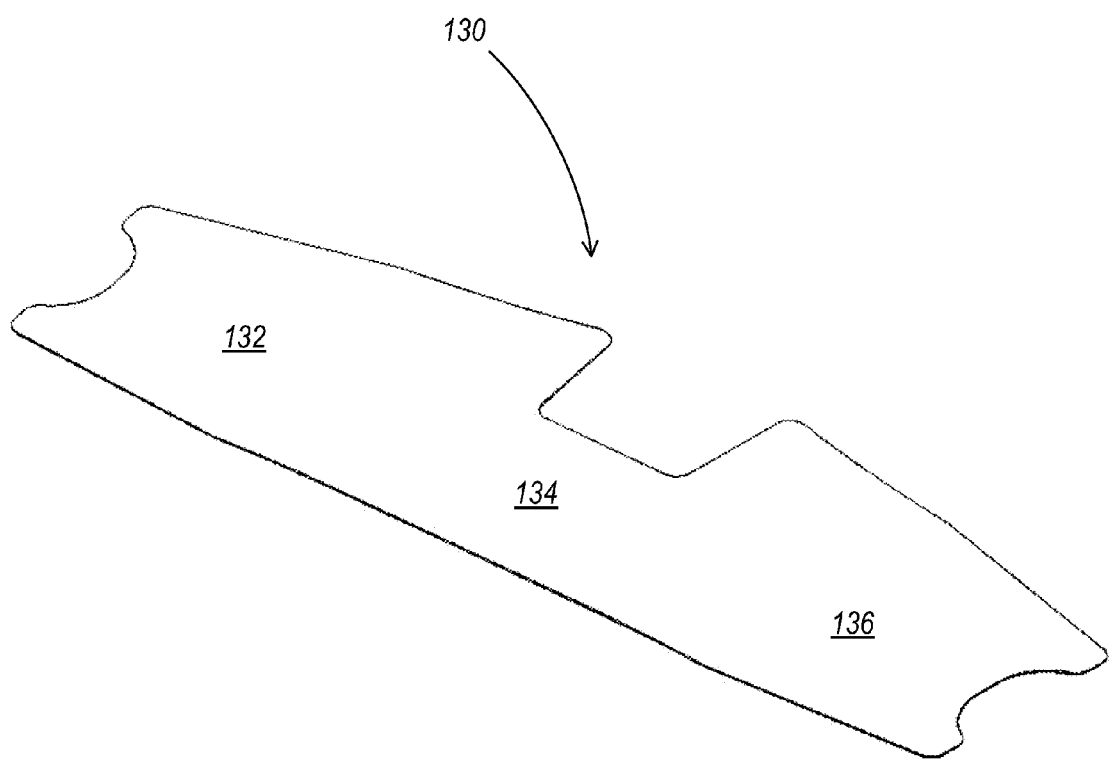
FIG. 6 illustrates a perspective view of a constrained layer in accordance with an embodiment.

In one embodiment, the constrained layer 130 can be manufactured by stamping a design from a substantially flat material. In another embodiment, the material can be laser cut or machine cut to a desired design. FIG. 6 depicts a constrained layer 130 that has been cut and is prepared to be bent prior to attachment to a head stack assembly 26. The constrained layer 130 includes a first portion, the top damping plate 132, a second portion, the base wall damping plate 134, and a third portion, the bottom damping plate 136. The constrained layer 130 can then be bent into shape with the base wall damping plate 134 extending in a plane that is substantially transverse to at least one of the top damping plate 132 in the bottom damping plate 136. In one embodiment, the constrained layer 130 is bent such that the base wall damping plate 134 is substantially perpendicular to both the top damping plate 132 and the bottom damping plate 136.

Figure 7:
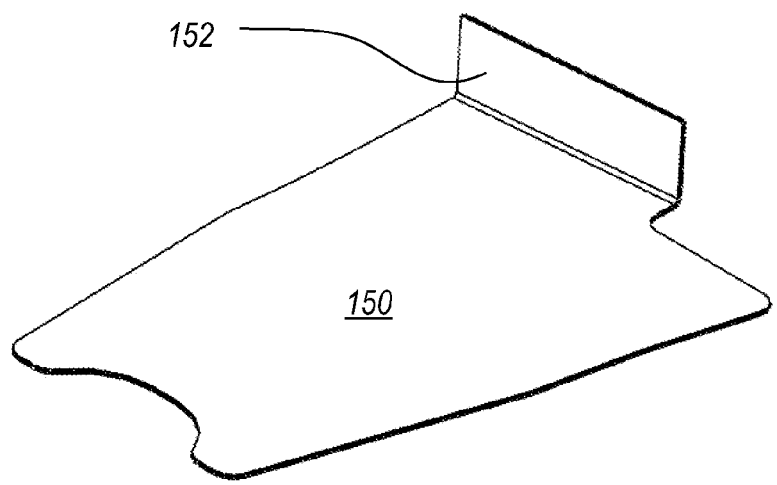
FIG. 7 illustrates a perspective view of a constrained layer in accordance with an embodiment.

FIG. 7 depicts an embodiment of a constrained layer 150 that extends in a first plane coupled to, or formed integrally with, a back wall damping plate 152 that extends in a second plane that is substantially transverse to the first plane. In one embodiment, the constrained layer 150 is configured to be positioned on the top surface 112 of an actuator arm 32. In another embodiment, the constrained layer 150 is configured to be positioned on a bottom surface 144 of an actuator arm 32. Back wall damping plate 152 is configured to engage and be coupled to the actuator base wall 140 adjacent to the actuator on 32.

Figure 8:
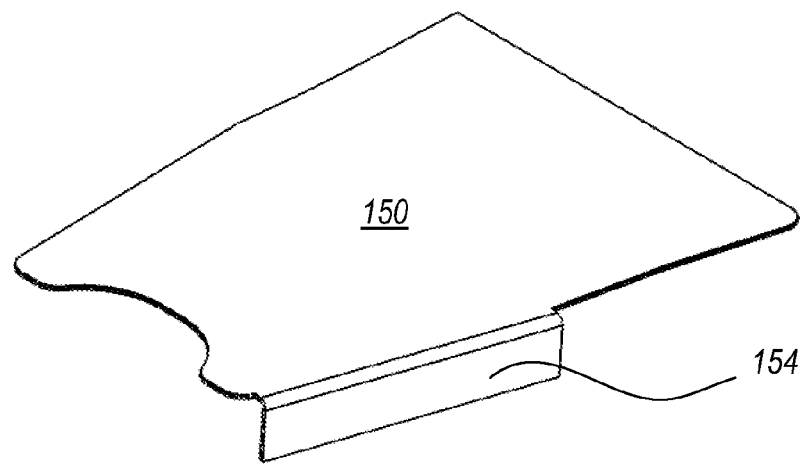
FIG. 8 illustrates a perspective view of another constrained layer in accordance with an embodiment.

FIG. 8 also depicts an embodiment of the constrained layer 150 that extends in a first plane and has a side damping plate 154 that extends in a second plane substantially transverse to the first plane. In one embodiment, the constrained layer 150 of FIG. 8 is configured to be positioned on the top surface 112 of an actuator arm 32. In another embodiment, the constrained layer 150 is configured to be positioned on a bottom surface 144 of an actuator arm 32. The side damping plate 154 is configured to extend along and be coupled to a side surface 142 of the actuator arm 32.

Figure 9:
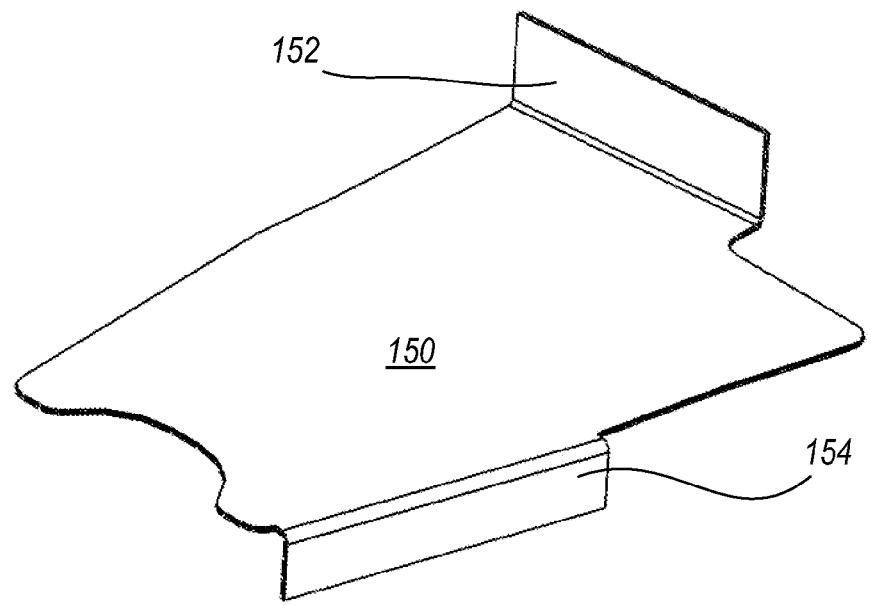
FIG. 9 illustrates a perspective view of another constrained layer in accordance with an embodiment.

FIG. 9 depicts an embodiment of the constrained layer 150 that extends in a first plane and has a side damping plate 154 that extends in a second plane substantially transverse to the first plane. The constrained layer 150 also includes a back wall damping plate 152 that extends in a third plane that is substantially transverse to the first plane. In one embodiment, the constrained layer 150 of FIG. 9 is configured to be positioned on the top surface 112 of an actuator arm 32. The back wall damping plate 152 is configured to engage and be coupled to an actuator base wall 140. The side damping claim 154 is configured to extend along and be coupled to a side surface 142 of the actuator arm 32. In another embodiment, the constrained layer 150 of FIG. 9 is configured to be positioned on the bottom surface 144 of an actuator arm 32.

Figure 10:
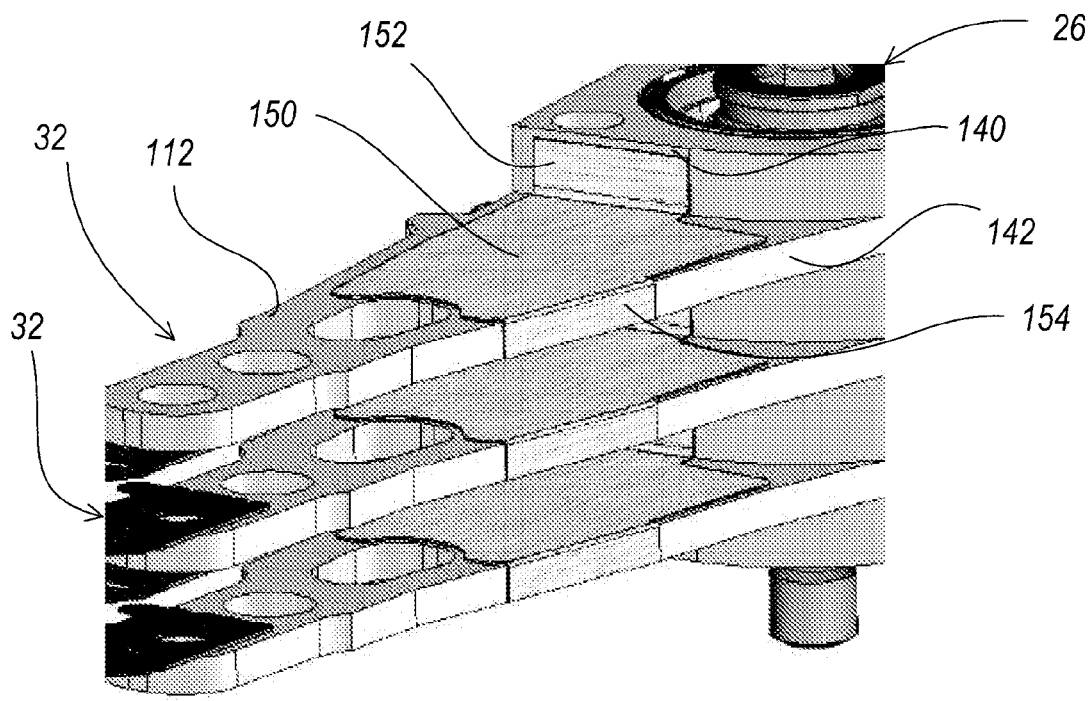
FIG. 10 illustrates a perspective view of a head stack assembly having a constrained layer in accordance with one embodiment.

FIG. 10 illustrates the constrained layer 150 having both the back wall damping plate 152 and the side damping plate 154 positioned on a head stack assembly 26. While the constrained layer 150 is depicted as being positioned on a top surface 112 of the actuator arms 32 in FIG. 10, it is contemplated that the constrained layer 150 can be positioned on a bottom surface 144 of the actuator arms 32. The back wall damping plate 152 is positioned to engage and be coupled to the actuator base wall 140 via the viscoelastic layer. The side damping plate 154 extends along a side surface 142 of the actuator arm 32 and is coupled thereto.

Although the back wall damping plate 152 and the side damping plate 154 are depicted in the figures as extending in substantially perpendicular angles with respect to the constrained layer 150, it is contemplated that at least one of the back wall damping plate 152 and the side damping plate 154 extends from the constraining layer 150 at an angle other than substantially perpendicular. For example, in some embodiments, the actuator base wall 140 and the side surface 142 of the actuator arm 32 can extend from the top surface 112 at an angle other than perpendicular. In such embodiments, it is preferable to have at least one of the back wall damping plate 152 and the side damping plate 154 to extend at a corresponding angle. In some embodiments, the angle can range from between about 45° to about 90°. In some embodiments, the angle can range from between about 60° to about 90°. In some embodiments, the angle can range from between about 75° to about 90°.

In some embodiments, the constrained layer 150 includes a nonmagnetic metallic material that is bent to provide the portions providing an out-of-plane feature. In some embodiments, the constrained layer 150 can be molded or otherwise constructed to form the portions extending in planes transverse to the planes of the constrained layer. In some embodiments, each part of the constrained layer 150 is attached to either the adjoining actuator arm 32 or the actuator base wall 140. In some embodiments, the constrained layer 150 is attached only to portions of at least one of the adjoining actuator arm 32 or the actuator base wall 140.

As explained above, some embodiments described here in increase the constrained to damping energy in the viscoelastic layer in both in-plane and out-of-plane modes. The embodiments create more surface area in both horizontal and vertical faces in continuous constrain, which provides stiffer effects of cantilever and fixed boundary conditions at the root of the actuator arm. These constructions increase energy dissipation in constrained surface area in continuous vertical and horizontal deformation. The folded, bent, or otherwise manufactured transverse portions provide a fixed constraint at one end to the constrained layer, which generates improved shearing and bending strain in the viscoelastic layer, and increases energy damping.

In one embodiment, the constrained layer 150 can extend along a top surface 112 of an actuator arm 32 and along its bottom surface 144 of the actuator arm 32. In some embodiments, the layer 150 extends along the top surface 112 of the actuator arm 32 and along the bottom surface 144 of the actuator arm 32 are connected via a side damping plate 154 that is configured to engage and be coupled to the side surface 142 of the actuator arm 32. In some embodiments, this constrained layer 150 does not include a back wall damping plate 152, and in other embodiments, the constrained layer 150 can include the back wall damping plate 152 that is configured to engage the actuator base wall 140.

In one embodiment, a disk drive can include a disk having a recording surface and an actuator rotatable about an axis of rotation. The actuator can include an actuator body that is coupled with a first actuator arm, and the first actuator arm can be configured to rotate over the disk recording surface. The drive also preferably includes a damper disposed on the actuator arm that reduces, during use, vibration of the actuator arm. The damper preferably has a first portion that extends in a first plane substantially parallel with a plane defined by a surface of the first actuator arm and a second portion that extends in a second plane transverse to the first plane.

In some embodiments, the damper provides a constrained layer damper. The damper first portion and second portion can be integrally formed. For example, the portions can be manufactured from a single piece and be bent relate to each other. In some embodiments, the portions may be molded of a single, or multiple, materials to provide the described features and accomplish the described functions.

In one embodiment, the first actuator arm includes a top surface and a side surface, and the damper first portion is disposed on the top surface of the actuator arm. The second portion of the damper can extend along the side surface of the first actuator arm. In one embodiment, the second portion of the damper extends along a surface of the actuator body transverse to the top surface of the first actuator arm. In one embodiment, the second portion extends in a plane substantially perpendicular to the first portion.

In one embodiment, the drive further includes a second actuator arm positioned above and parallel to the first actuator arm. The second actuator arm can have a bottom surface. The drive can further include a damper third portion that extends substantially along the bottom surface of the second actuator arm. The damper first portion can extend along the top surface of the first actuator arm, and the damper second portion can connect the damper first portion and the damper third portion.

In one embodiment, the damper second portion is substantially perpendicular to at least one of the damper first portion and damper third portion. The damper first portion, second portion, and third portion can be integrally formed. In some embodiments, the drive further includes a damper fourth portion that extends substantially along a side surface of at least one of the first and second actuator arms.

One embodiment provides that the disk drive further includes a damper third portion that extends substantially along a bottom surface of the first actuator arm. The damper first portion preferably extends along the top surface of the first actuator arm, and the damper second portion connects the damper first portion and the damper third portion by extending along a side surface of the first actuator arm.

In some embodiments, the disk drive can further include a damper third portion. The damper second portion can extend along a side of the first actuator arm, and the third portion can extend along a surface of the actuator body.

In one embodiment, a disk drive actuator arm constrained layer damper is provided, for reducing, during use, vibration of the actuator arm. The damper preferably includes a first substantially planar portion configured to be positioned on and coupled to a surface of an actuator arm and a second substantially planar portion extends in a plane transverse to the first planar portion. The second planar portion is preferably configured to be coupled to at least one of a side surface of the actuator arm or a surface of an adjacent actuator body.

In one embodiment, the second planar portion extends in a plane substantially perpendicular to the first planar portion. The second planar portion preferably, in one embodiment, extends along a plane defined by the side surface of the actuator arm and is configured to be coupled to the side surface. Some embodiments provide that the damper further include a third planar portion, extending along a plane defined by a surface of the actuator body, transverse to the first planar portion, and is configured to be coupled to the actuator body surface.

The damper can further include a third planar portion configured to be positioned on and coupled to a bottom surface of an adjacent actuator arm. The second planar portion preferably connects the first planar portion and the third planar portion. In one embodiment, the second planar portion is configured to be coupled to a surface of the actuator body transverse to both the first planar portion and the third planar portion. In some embodiments, the first planar portion, the second planar portion, and the third planar portion are integrally formed.

Provided herein is a method of damping vibrations in an actuator arm of a disk drive. In one embodiment, the method includes providing a damper having a first substantially planar portion that defines a first plane and a second substantially planar portion that extends in a second plane transverse to the first plane. The method can further include coupling the first substantially planar portion to at least one of a top surface and a bottom surface of an actuator arm and coupling the second substantially planar portion to at least one of a side surface of the actuator arm and a surface of an actuator body. In one embodiment, the method further includes coupling a third planar portion, transverse the second planar portion, to one of a surface of an adjacent actuator arm and the other of the top surface and the bottom surface.

The description of the invention is provided to enable any person skilled in the art to practice the various embodiments described herein. While the embodiments have been particularly described with reference to the various figures and disclosure, it should be understood that these are for illustration purposes only and should not be taken as limiting the scope of the inventions.

There may be many other ways to implement the embodiments. Various functions and elements described herein may be partitioned differently from those shown without departing from the spirit and scope of the disclosure. Various modifications to these embodiments will be readily apparent to those skilled in the art, and generic principles defined herein may be applied to other embodiments. Thus, many changes and modifications may be made to embodiments, by one having ordinary skill in the art, without departing from the spirit and scope of the disclosure.

A reference to an element in the singular is not intended to mean "one and only one" unless specifically stated, but rather "one or more." The term "some" refers to one or more. Any headings and subheadings are used for convenience only, do not limit the disclosure, and are not referred to in connection with the interpretation of the description of the disclosure. All structural and functional equivalents to the elements of the various embodiments described throughout this disclosure that are known or later come to be known to those of ordinary skill in the art are expressly incorporated herein by reference and intended to be encompassed by the disclosure. Moreover, nothing disclosed herein is intended to be dedicated to the public regardless of whether such disclosure is explicitly recited in the above description.

What is claimed is:

1. A disk drive comprising:
   a disk having a recording surface;
   an actuator rotatable about an axis of rotation, the actuator comprising an actuator body coupled with a first actuator arm, the first actuator arm configured to rotate over the disk recording surface; and
   a damper disposed on the first actuator arm that reduces, during use, vibration of the actuator arm, the damper having a first portion that extends in a first plane substantially parallel with a plane defined by a surface of the first actuator arm and a second portion that extends in a second plane transverse to the first plane, wherein the damper first portion and second portion are integrally formed with one another.

2. The disk drive of claim 1, wherein damper comprises a constrained layer damper.

3. The disk drive of claim 1, wherein the damper first portion and second portion are adjacent to a bend in the damper.

4. The disk drive of claim 1, wherein the first actuator arm comprises a top surface and a side surface, and wherein the damper first portion is disposed on the top surface of the first actuator arm.

5. The disk drive of claim 4, wherein the second portion of the damper extends along the side surface of the first actuator arm.

6. The disk drive of claim 1, wherein the second portion extends in a plane substantially perpendicular to the first portion.

7. The disk drive of claim 1, further comprising:
   a damper third portion that extends substantially along a bottom surface of the first actuator arm; and
   wherein the damper first portion extends along the top surface of the first actuator arm and the damper second portion connects the damper first portion and the damper third portion by extending along a side surface of the first actuator arm.

8. A disk drive comprising:
   a disk having a recording surface;
   an actuator rotatable about an axis of rotation, the actuator comprising an actuator body coupled with a first actuator arm, the first actuator arm configured to rotate over the disk recording surface; and
   a damper disposed on the first actuator arm that reduces, during use, vibration of the actuator arm, the damper having a first portion that extends in a first plane substantially parallel with a plane defined by a surface of the first actuator arm and a second portion that extends in a second plane transverse to the first plane, wherein the first actuator arm comprises a top surface and a side surface, and the damper first portion is disposed on the top surface of the actuator arm and the second portion of the damper extends along a surface of the actuator body transverse to the top surface of the first actuator arm.

9. A disk drive comprising:
   a disk having a recording surface;
   an actuator rotatable about an axis of rotation, the actuator comprising an actuator body coupled with a first actuator arm, the first actuator arm configured to rotate over the disk recording surface;
   a damper disposed on the first actuator arm that reduces, during use, vibration of the actuator arm, the damper having a first portion that extends in a first plane substantially parallel with a plane defined by a surface of the first actuator arm and a second portion that extends in a second plane transverse to the first plane;
   a second actuator arm positioned above and parallel to the first actuator arm, the second actuator arm comprising a bottom surface; and
   a damper third portion that extends substantially along the bottom surface of the second actuator arm; and
   wherein the damper first portion extends along the top surface of the first actuator arm and the damper second portion connects the damper first portion and the damper third portion.

10. The disk drive of claim 9, wherein the damper second portion is substantially perpendicular to at least one of the damper first portion and damper third portion.

11. The disk drive of claim 9, wherein the damper first portion, second portion, and third portion are integrally formed.

12. The disk drive of claim 9, further comprising a damper fourth portion that extends substantially along a side surface of at least one of the first and second actuator arms.

13. A disk drive comprising:
  a disk having a recording surface;
  an actuator rotatable about an axis of rotation, the actuator comprising an actuator body coupled with a first actuator arm, the first actuator arm configured to rotate over the disk recording surface; and
  a damper disposed on the first actuator arm that reduces, during use, vibration of the actuator arm, the damper having a first portion that extends in a first plane substantially parallel with a plane defined by a surface of the first actuator arm, a second portion that extends in a second plane transverse to the first plane, and a damper third portion, and wherein the damper second portion extends along a side of the first actuator arm and the third portion extends along a surface of the actuator body.

14. A disk drive actuator arm constrained layer damper, for reducing, during use, vibration of the actuator arm, the damper comprising:
  a first substantially planar portion configured to be positioned on and coupled to a top surface of an actuator arm; and
  a second substantially planar portion extending in a plane transverse to the first substantially planar portion and configured to be coupled to at least one of a side surface of the actuator arm or a surface of an adjacent actuator body;
  wherein the first substantially planer portion and the second substantially planar portion are integrally formed with one another and are adjacent to and connected by a bend in the damper at an edge of the damper, and during use, the bend creates increased strain energy inside the damper and provides increased damping energy dissipation.

15. The actuator arm damper of claim 14, wherein the second substantially planar portion extends in a plane substantially perpendicular to the first substantially planar portion.

16. The actuator arm damper of claim 14, wherein the second substantially planar portion extends along a plane defined by the side surface of the actuator arm and is configured to be coupled to the side surface.

17. A disk drive actuator arm constrained layer damper, for reducing, during use, vibration of the actuator arm, the damper comprising:
  a first substantially planar portion configured to be positioned on and coupled to a top surface of an actuator arm; and
  a second substantially planar portion extending in a plane transverse to the first substantially planar portion and configured to be coupled to at least one of a side surface of the actuator arm or a surface of an adjacent actuator body, wherein the second substantially planar portion extends along a plane defined by the side surface of the actuator arm and is configured to be coupled to the side surface; and
  a third substantially planar portion, extending along a plane defined by a surface of the actuator body, transverse to the first substantially planar portion, and is configured to be coupled to the actuator body surface.

18. A disk drive actuator arm constrained layer damper, for reducing, during use, vibration of the actuator arm, the damper comprising:
  a first substantially planar portion configured to be positioned on and coupled to a top surface of an actuator arm;
  a second substantially planar portion extending in a plane transverse to the first planar portion and configured to be coupled to at least one of a side surface of the actuator arm or a surface of an adjacent actuator body; and
  a third substantially planar portion configured to be positioned on and coupled to a bottom surface of an adjacent actuator arm, and wherein the second substantially planar portion connects the first substantially planar portion and the third substantially planar portion.

19. The actuator arm damper of claim 18, wherein the second substantially planar portion is configured to be coupled to a surface of the actuator body transverse to both the first substantially planar portion and the third substantially planar portion.

20. The actuator arm damper of claim 18, wherein the first substantially planar portion, the second substantially planar portion, and the third substantially planar portion are integrally formed with one another.

21. A method of damping vibrations in an actuator arm of a disk drive, the method comprising:
  bending a damper so that the damper has a first substantially planar portion that defines a first plane and a second substantially planar portion that extends in a second plane transverse to the first plane;
  coupling the first substantially planar portion to at least one of a top surface and a bottom surface of an actuator arm; and
  coupling the second substantially planar portion to at least one of a side surface of the actuator arm and a surface of an actuator body.

22. A method of damping vibrations in an actuator arm of a disk drive, the method comprising:
  providing a damper having a first substantially planar portion that defines a first plane, a second substantially planar portion that extends in a second plane transverse to the first plane, and a third substantially planar portion transverse the second substantially planar portion;
  coupling the first substantially planar portion to at least one of a top surface and a bottom surface of an actuator arm;
  coupling the second substantially planar portion to at least one of a side surface of the actuator arm and a surface of an actuator body; and
  coupling the third substantially planar portion to one of a surface of an adjacent actuator arm and the other of the top surface and the bottom surface.

* * * * *